US008095239B2

(12) United States Patent
Root et al.

(10) Patent No.: US 8,095,239 B2
(45) Date of Patent: Jan. 10, 2012

(54) METHOD AND APPARATUS FOR CONTROLLING THE MOTION OF A ROBOTIC DEVICE (75) Inventors: Timothy D. Root, Nashua, NH (US); Jeffrey T Muller, Stow, MA (US)

(73) Assignee: North End Technologies, Inc, Nashua, NH (US)

( * ) Notice: Subject to any disclaimer, the term of this patent is extended or adjusted under 35 U.S.C. 154(b) by 772 days.

(21) Appl. No.: 12/239,891

(22) Filed: Sep. 29, 2008

(65) Prior Publication Data

US 2010/0082156 A1   Apr. 1, 2010

(51) Int. Cl.
*G05B 15/00* (2006.01)

(52) U.S. Cl. ........ 700/264; 700/245; 700/248; 700/258; 700/259; 700/260; 318/567; 318/568.1; 318/568.11; 318/568.12; 318/568.16; 701/25; 180/24.05

(58) Field of Classification Search ................... 700/245, 700/248, 258, 259, 260; 318/567, 568.1, 318/568.11, 568.12, 568.16; 701/25; 180/24.05
See application file for complete search history.

(56) References Cited

U.S. PATENT DOCUMENTS

| | | | | |
|---|---|---|---|---|
| 6,368,177 B1 * | 4/2002 | Gabai et al. | ............ | 446/404 |
| 6,535,793 B2 * | 3/2003 | Allard | .............. | 700/259 |
| 6,687,571 B1 * | 2/2004 | Byrne et al. | .............. | 700/245 |
| 6,845,297 B2 * | 1/2005 | Allard | .............. | 700/259 |
| 7,228,203 B2 * | 6/2007 | Koselka et al. | ........... | 700/245 |
| 7,272,467 B2 * | 9/2007 | Goncalves et al. | ........... | 700/245 |
| 7,415,321 B2 * | 8/2008 | Okazaki et al. | ........... | 700/245 |
| 7,539,557 B2 * | 5/2009 | Yamauchi | .......... | 700/245 |
| 7,584,019 B2 * | 9/2009 | Feingold et al. | ........... | 700/245 |
| 7,593,787 B2 * | 9/2009 | Feingold et al. | ........... | 700/245 |
| 7,603,201 B2 * | 10/2009 | Feingold et al. | ........... | 700/245 |
| 7,953,526 B2 * | 5/2011 | Durkos et al. | .......... | 701/25 |
| 2008/0027590 A1 * | 1/2008 | Phillips et al. | .......... | 701/2 |
| 2010/0152897 A1 * | 6/2010 | Muller | ........... | 700/259 |

* cited by examiner

*Primary Examiner* — James Trammell
*Assistant Examiner* — McDieunel Marc
(74) *Attorney, Agent, or Firm* — Robert Schuler (57) ABSTRACT A robot movement control device is connected to a communications network in a remote location relative to a robotic device that is also connected to the communications network. The robot movement control device is an electronic device with a video display for displaying a real-time video image sent to it by a camera associated with the robot. A robot movement control overlay is displayed in the field of the real-time video image at the robot control device and robot control commands are generated by selecting locations within the boundary of the movement control overlay which include speed and directional information. The control commands are sent by the robot control device over the network to the robot which uses the commands to adjust its speed and direction of movement.

17 Claims, 8 Drawing Sheets

FIG. 3  REAL-TIME VIDEO IMAGE 30

FIG. 4   MOVEMENT CONTROL OVERLAY 40

FIG. 5   COMPOSITE VIDEO IMAGE/CONTROL OVERLAY 50

METHOD AND APPARATUS FOR CONTROLLING THE MOTION OF A ROBOTIC DEVICE

FIELD OF THE INVENTION

The invention relates generally to the remote control of robotic device motion and specifically to a user interface that includes a movement control overlay function that is manipulated to control the motion of a robotic device.

BACKGROUND

Mobile, electromechanical devices such as robotic devices are designed to move around their environment, whether this environment is inside a building or an outside environment. Some of these robotic devices are designed to move autonomously and some are designed to move according to user generated commands. Commands to control the movement of a robotic device can be generated by a user locally, with respect to the robotic device, such that the user is able to directly observe and then control the robotic devices movement with a wireless control module for instance, or commands to control the movement of a robotic device can be generated remotely by a user and sent over a network for delivery to the robotic device by a wireless router or access point with which the robotic device is associated. In the event that the movement commands are generated by a user from a location remote to the robotic device, it can be important that the user has some sort of visual reference of the environment in which the robotic device is moving. This visual reference can be a schematic or map of the environment local to the robotic device or this visual reference can be a real-time video image of the environment local to the robotic device. In either case, it is useful to have this visual reference when remotely controlling the movements of a robotic device in its environment.

Depending upon the application, it can be satisfactory that the visual environmental reference can be a floor-plan schematic of the environment in which the robotic device is located, or it may be more useful to have a video camera attached in some manner to the robotic device which can deliver real-time video information that is helpful to the user when controlling the movement of the robotic device from a remote location. So, for example, in the case were the robotic device is moving around in an environment in which most or all of the objects in the environment are fixed, a schematic representation of the local environment can be satisfactory. On the other hand, in the case were the robotic device is moving around in an environment that includes other objects that are moving around or an environment in which it is expected to interact with people, is can be more useful to have a real-time video image of this environment available to a remote user. Typically, the attitude of a video camera attached to a robotic device can be controlled, which is to say that its pan and tilt can be controlled independently of the movement of the robotic device. This camera pan/tilt control can be affected manually or automatically, again depending upon the application. So in the event that the function of the robotic device is primarily to interact with people, it may be best that the camera automatically point in the direction of the person speaking at the time. Or in the case where the operation of the robotic device is primarily directed to visual (security application?) as opposed to audio cues, the camera many be manually controlled by the remote user.

Typically, a robotic movement control module is implemented as either a wireless, hand-held module if the control is local or an application running on some sort of computational device connected to a network if the control is remote. In the case where user control is local to the robot, the hand-held device typically includes a joystick mechanism that is employed by the user to direct the movement and the speed of a robotic device. U.S. Pat. No. 6,604,022 disclosed such a hand-held device that incorporates a joystick that has eight compass points to direct a robot's movements. In addition to controlling the direction of movement, the joystick is used to control the speed of the robot if it is engaged from more than three seconds, in which case the robot's speed will increase in the direction selected on the joystick. In the case where user control is remote, a virtual joystick may be displayed on a computer screen that can be manipulated to select the direction and speed of a robotic device. So for instance, an icon can be displayed on the computer screen that represents a joystick which is manipulated using a point and click tool such as a mouse to select a direction and speed. Another method used to control the movements of a robot is described in U.S. Pat. Nos. 6,845,297 and 6,535,793. As described in these two patents, a computer screen displays a graphical representation of the environment of a robot and the user defines locations within the representation that are positions to which the robot moves. The user than selects a "go" button on the computer screen and the robot starts to move toward the position defined in the representation at a selected speed. In this case, a camera is attached to the robot that is controlled manually also using camera control icons that are displayed on the computer screen. Yet another method for controlling the movement of a robot is described in US patent application publication no. 2007/0199108A1 in which both a joystick method and a coordinate selection method are used to determine the movement of the robot. In this application, locations in a room or the room to which the user wants the robot to move are selected on a representation of the room or structure that is displayed on a computer monitor screen and the robot is instructed to move to the location selected. Additionally, one or more cameras can be mounted on the robot with one or both of the cameras used to display a "robot perspective" view of its local environment for showing an "eye level" view or a "ground plane" view which shows the floor in front of the robot and is used for steering the robot. Although all of the robot movement control methods described above are effective means to control the movement of a robotic device in its environment, they are limited to either pre-selecting a position in space to command a robot to move to or they are limited to a real-time movement control icon that, although proximate to the representation of the robot's environment, forces the user to move the focus of their eyes back and forth from the movement control icon to the environmental representation to determine how and when to control a robots movements. This continual visual refocusing from one position on a computer monitor screen used to control a robots movement to another position on the screen that displays the robots movement is a less than ideal method for controlling the movement of a robot.

SUMMARY OF INVENTION

The limitations associated with the prior art robot movement control methods are mitigated by displaying a robot movement control overlay in the field of a real-time video image generated by a camera mounted on a robot. The method for controlling the movement of a robot is comprised of a robot movement control overlay that is displayed in the field of a real-time video image that is generated by a camera mounted on the robot; a location within the robot movement control overlay is selected that corresponds to the desired direction and speed of the robot movement; selection of this location within the overlay causes a control message to be generated and sent to the robot that includes the desired direction and speed information; the robot receives the control message and uses the direction and speed information contained in the message to move in the selected direction and at the selected speed.

DETAILED DESCRIPTION

Figure 1:
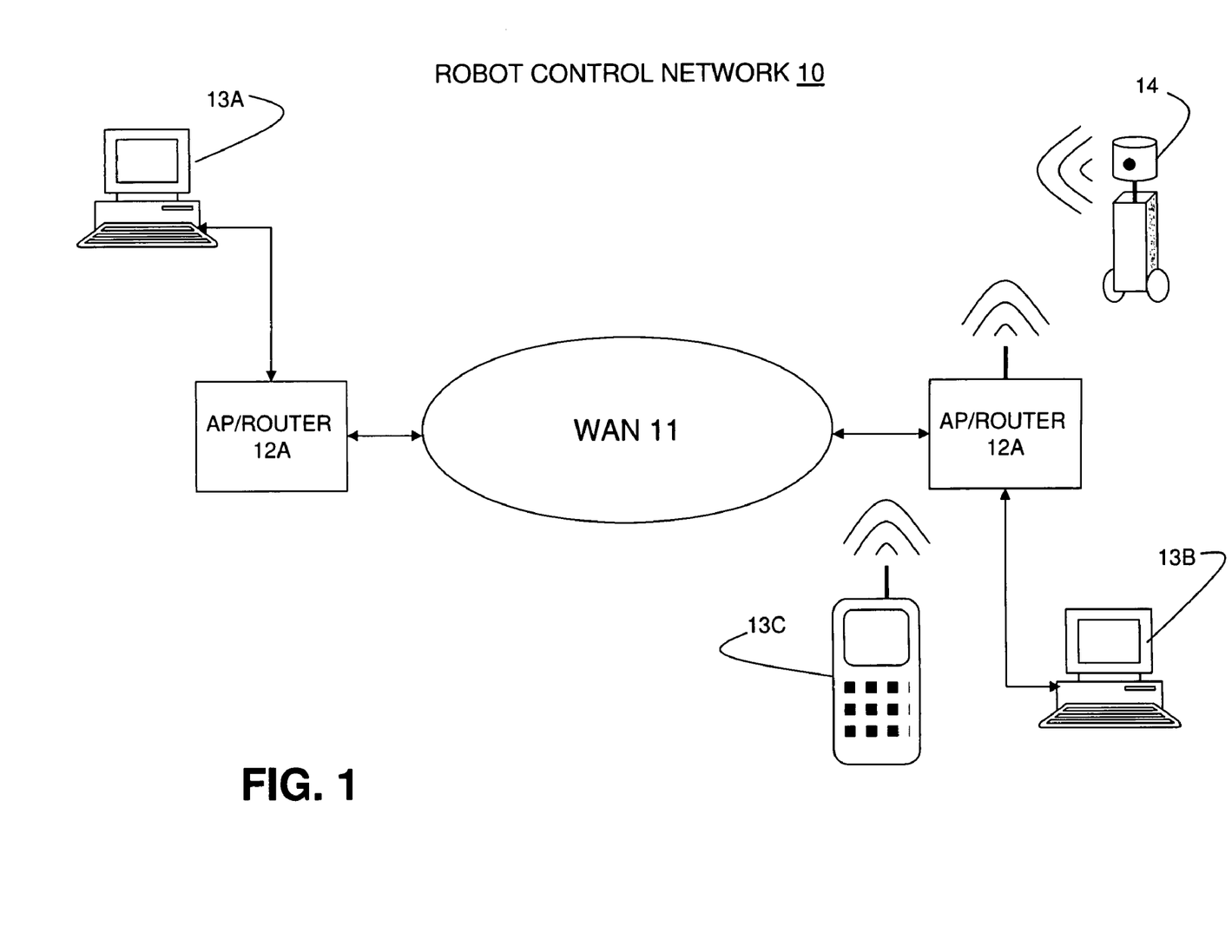
FIG. 1 is a diagram of a communications network showing the elements necessary to carry out the invention.

Typically, there are two classes of mobile robotic devices. One class of device can move around their environment autonomously and a second class of device can be commanded to move around their environment manually. Mobile robotic devices exist that combine both automatic movement and movement under manual control; however, this description is directed primarily too mobile robotic devices that are manually controlled to move around their environment. This manual control of a robotic device's movement can be performed in a location remote from the robotic device or it can be performed locally to the robotic device. FIG. 1 shows a robot control network 10 that includes a wide area network (WAN) 11, two routers or access points 12A and 12B, three robot control devices 13A, 13B and 13C and a mobile robotic device 14 which will be referred to simply here as a "robot". The WAN 11 can be a public network such as the Internet or a private, enterprise network and it generally operates to support the transmission of robot control commands from a remote location, such as the location of the robot control device 13A, to the robot 14. FIG. 1 shows two routers or access points 12A and 12B connected to the WAN 11 which operate to receive robot control commands from any of the three robot control devices 13A-C and transmit the command, over a wireless medium, to the robot 14. As shown in FIG. 1, router 12A is a wired device, that is, it is connected to the WAN 11 and to the robot control devices 13A in a hard-wired manner which can be an Ethernet cable for example. Also as shown in FIG. 1, router 12B is a wireless device that can be connected to the WAN 11 via an Ethernet cable and which communicates with the robot 14 in a wireless manner. The 802.11b wireless communication protocol can be implemented on router 12B in order to support the transmission of robot control commands between router 12B and the robot 14 in a wireless manner, although any wireless communications protocol with a range appropriate to the application can be employed. Each of the robot control devices 13A-13C can be a different type of electronic device capable of creating and transmitting a robot control command. Control device 13A can be a desk-top computer, device 13B can be a lap-top computer and device 13C can be a hand-held communications device, for instance. In the event that the robot 14 movement is controlled from a remote location, control device 13A is employed by a user to generate a robot movement control command that is transmitted over the network 10 to the robot 14 which receives that command and executes a movement or movements according to instructions included in the command. According to one embodiment of the invention, each of the robot control devices 13A-13C includes a robot movement control module that implements a robot movement control function that visually overlays a real-time video image of the robot's environment. The movement control overlay is manipulated by a user to generate robot movement control commands without the need to look away from the video display which is a real-time representation of the robots location within its environment. Further, and in another embodiment, the robot movement control command can be employed to automatically control the tilt of a camera associated with the robot.

Figure 2A:
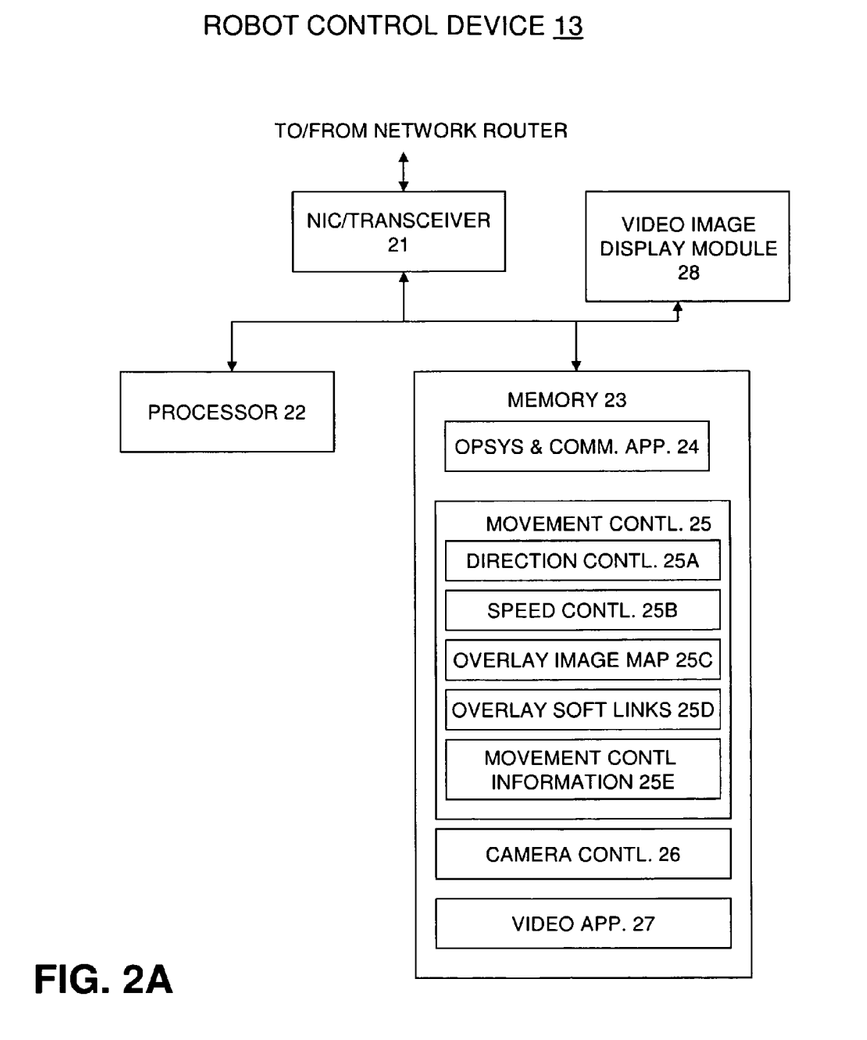
FIG. 2A is a functional block diagram of a robotic device movement control module.

FIG. 2A is a diagram showing the functional elements, included in any one of the robot control devices, 13A-13C, that are necessary to implement the preferred embodiment of the invention. For the purpose of this description, the robot control devices 13A-13C are referred to collectively as control device 13. According to whether the control device 13 is connected to a router in a wired or wireless manner, it includes either a network interface card (NIC) or a transceiver module 21 for sending and receiving messages over the network 10, which messages, among other things, include robot movement control commands. Control device 13 also includes a processor module 22 which operates according to instructions and commands included in several functional modules stored in a memory 23 to effect the operation of the control device 13 and, among other things, to display a real-time video image of a robots environment on a video image display module 28. The functional modules stored in memory 23 include an operating system and communication application module 24, a robot movement control module 25, a camera control module 26 and a real-time video application module 27. The operating system and communication application module 24 can be separate modules, but for the purpose of this description are considered to be one module as they do not have any direct effect on the operation of the invention. The operating system portion of module 24 includes general instructions and commands that are used by the processor 22 to coordinate the operation of the control device 13. These can be such operations as moving video information into and out of memory for display on the video image display device 28, transferring a message that includes a robot control command to the transceiver or NIC for transmission to a robot, or executing instructions to create robot movement control commands based on user commands generated as the result of manipulating the movement control overlay. Several operating systems are commercially available and are appropriate for use in such applications depending upon the platform that is used for a robot control module. The communication application can be either a wireless communication application or a wired communication application. In the event that a robot control module transmits messages to a robot wirelessly, the communication application can be based on the well know IEEE 802.11b standard communications protocol, and in the event that a robot control module transmits messages to a robot over a wired connection, the communication application can be based on the Ethernet standard communications protocol.

Continuing to refer to FIG. 2A, the robot movement control module 25 included in memory 23 is comprised of five submodules; namely, a robot direction control module 25A, a robot speed control module 25B, a movement control overlay image map store 25C, a soft link store 25D and a robot movement control information store 25E. The robot direction control module 25A controls the rotational direction or simply direction of the robot by sending different drive speed control signals to each of the driving members (wheels) of the robot. So if the robot has two drive wheels, a drive signal can include information to rotate a left one of the two wheels one revolution per second and the drive signal can include information to rotate a right one of the wheels two revolutions per second. The result is that the robot will rotate to the left at the selected speed for as long as this particular drive signal combination is applied. The robot speed control module 25B controls the speed of the robot by sending a control message to the robot that includes information that controls the revolutions per second at which both drive wheels of the robot rotate. The overlay image map store 25C stores a listing of pixel coordinates that define the appearance of a robot movement control overlay that appears in the field of a real-time video image displayed on the video image display module 28 associated with the robot control device 13. The overlay image can be created using an alpha blending technique that is available in many computer graphic development applications. In the preferred embodiment, this overlay appears in the field of the real-time video image whenever a control pointer, such as a pointer associated with a pointing device such as a computer mouse, is moved into the real-time video image field. The overlay soft link store 25D is comprised of a listing of coordinate groups, each group representing one robot movement control soft link that resides within the bounds of the visual overlay. Each soft link is associated with a single set of robot movement control information stored in the robot control information store 25E. Each robot movement control information set includes robot rotational direction and rotational speed and robot speed information that is sent to the robot direction control module 25A and robot speed control module 25B respectively to be included in a control message sent to the robot which when processed by a robot results in the robot moving towards a particular direction at a particular speed.

With further reference to FIG. 2A, the camera control module 26 stores functionality that can automatically control the tilt angle of a robot's camera according to the speed at which the robot is moving. In the preferred embodiment, the automatic control of a robot's camera tilt is directly related to the speed of the robot. For example, when the robot is initialized but at rest, the camera can be tilted at an angle that allows a user to observe the robots environment at the level of the cameras lens, which can be defined to be ninety degrees of tilt. As the robot starts to move in a particular direction, the camera control module 26 receives a message from the robot speed control module 25B that contains speed information. The camera control module then generates a message, which includes the tilt angle of the camera that corresponds to the current speed, and this message is transmitted to the robot. In operation, when a robot is activated or initialized and before it starts to move, the camera angle can move from an uninitialized position (in this position the camera lens can be pointed down which can be specified as zero degrees) to an initialized position which can be specified to be ninety degrees up from the uninitialized position (the camera lens can be centered on a horizontal position). At the point that the robot is instructed to move, and depending upon the speed of its movement, the camera angle can be controlled by the camera control module 26 to change to a different tilt angle, which can be from between zero degrees to ninety degrees depending upon the speed of the robot. The real-time video application 27 includes all of the functionality necessary to process and display video information received from the camera associated with the robot.

The listing of coordinates stored in the overlay image map 25C of FIG. 2A, can be a listing of pixel row/column coordinates that are developed using the alpha blending technique mentioned earlier. Each pixel coordinate includes the row and column position in a display where a particular color is displayed that forms a portion of the movement control overlay image to the video image on the screen. The control overlay does not necessarily entirely hide the underlying video image, but can appear as a modification of the colors of the image on the screen. For example, the control overlay can be bounded by a black line and the space within the bounds of the black line can be displayed as a lighter color than would ordinarily be displayed in the video image. The functionality and underlying design of the control overlay will be described in greater detail with reference to FIG. 4. In operation, when a user moves a movement control pointer into the field of a real-time video image displayed on a screen associated with a robot control device, such as device 13, the robot movement control overlay appears in the field of the video image and the user can position the control pointer over a position or location within the boundary of the overlay and select this position which causes the robot movement control module 25 to generate a message that is sent to the robot which includes robot movement information such as speed and the direction and speed in which the robot turns. While active, the control pointer can be continually repositioned while the robot is moving in order to dynamically adjust the speed and rotational direction of the robots. Or, discrete motion control information can be selected by activating and deactivating the movement control pointer at different locations within the movement control overlay. The advantage in such an arrangement is that the user never has to look away from the video display, which is the robot's perspective of its position within the environment in which it is operating. This permits the effective and very fluid control of the robot's movement within its environment.

Figure 2B:
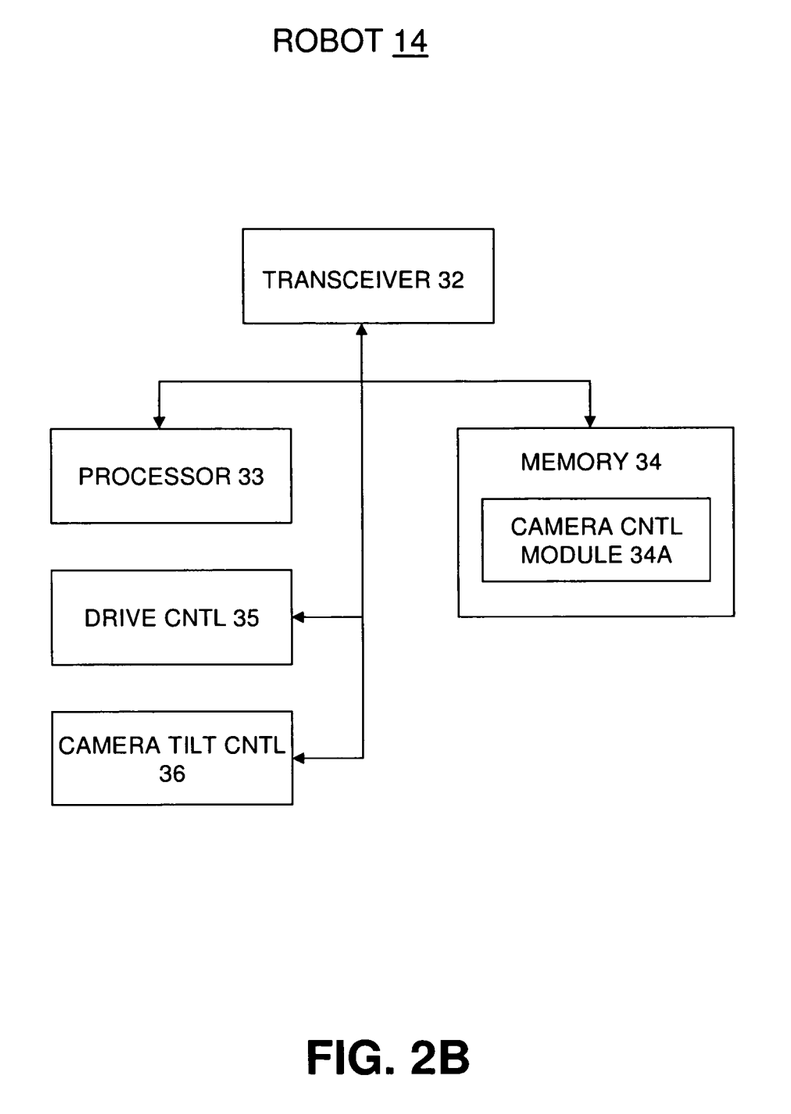
FIG. 2B is a functional block diagram of robotic device movement functionality.

FIG. 2B illustrates a second embodiment of a robot control arrangement in which the camera control functionality 26 is implemented on the robot 14 as opposed to being located in the robot control module 13 of FIG. 2A. FIG. 2B shows the robot 14 including, among other things, a transceiver 32 for receiving robot control messages from a robot control module and a processor 33 connected to the transceiver 32 and a memory 34 that generally operates in conjunction with functionality stored in the memory 33 to control the operation of the robot 14. The memory 34 stores functionality used by the processor to automatically generate camera pan/tilt control signals. More specifically, the memory 34 includes, among other things, a camera control module 34A. The camera control module 34A in conjunction with the processor 33 use robot speed information contained in a robot control message received from a robot control module to automatically generate a camera tilt angle signal that is sent to the camera tilt angle control module 35. This camera tilt angle signal contains information that the camera tilt angle control module 35 uses to control the tilt of the camera. In operation, when a robot is at rest the camera tilt angle can be controlled manually to be any particular angle or can be controlled automatically to be at a default tilt angle. In automatic operation, as the robot is commanded to start moving and gains speed, the camera tilt automatically increases providing the user with a more forward looking view of the robot's environment which allows the user to very easily control the robot's movements at the higher rate of speed. The objective in providing such functionality is to allow a user, controlling the robot from a remote location, to automatically view a real-time video image of the surface, over which the robot is moving, which is proximate to the robot. It was found that when a robot is controlled to move slowly, it is very often desirable for the user to be able to view the robot's immediate environment, specifically the surface over which it is traveling, in order to better control the movement of the robot.

Figure 3:
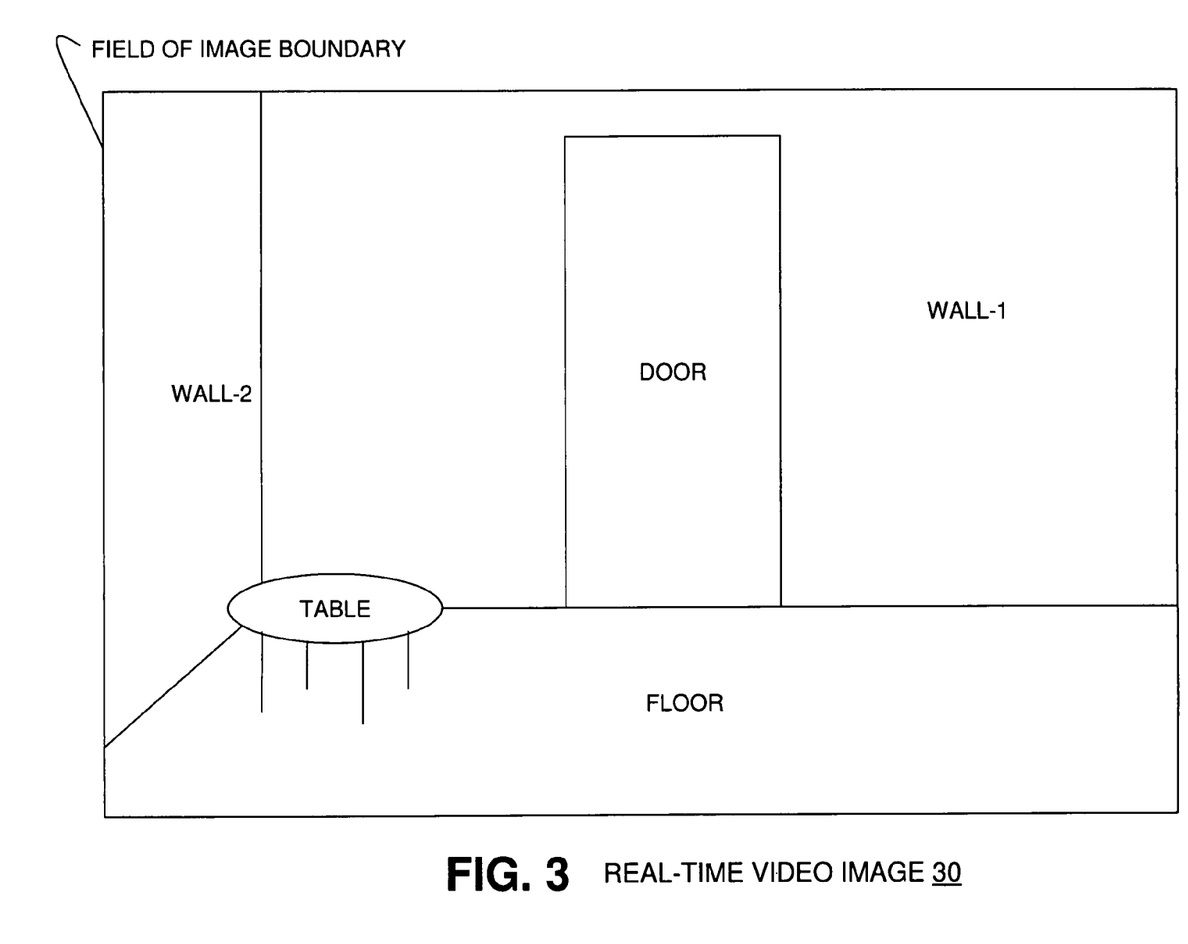
FIG. 3 is a representation of the local environment in which the robotic device moves.

FIG. 3 is a graphical representation of a real-time video image 30 of a robot's camera view of its local environment that is displayed at a control module, such as the control module 13A in FIG. 1. This real-time video image shows a portion of a room with two walls, wall-1 and wall-2, a door, a table and a floor all of which are confined to a particular display window 31. This window can occupy a portion or all of a robot control monitor screen either of which window format size can be selected by a user.

Figure 4:
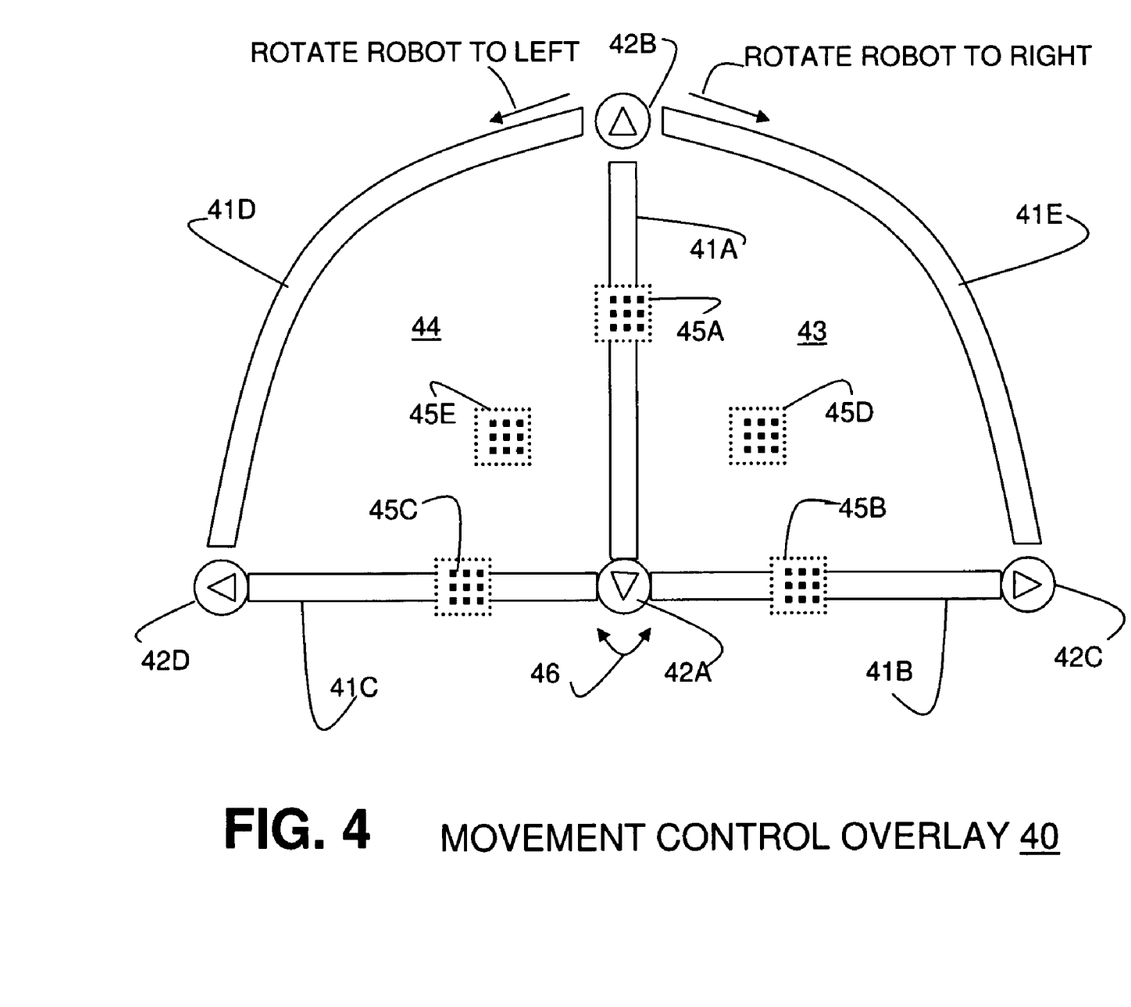
FIG. 4 is an illustration of a robot movement control overlay.

FIG. 4 is an illustration of a robot movement control overlay 40 that is employed by a user to control the rotational direction and speed of a robots movement in its environment. This overlay is displayed in the field of the real-time video image 30 as the result of a user moving a control pointer into the field of the video image. Control overlay 40 includes two movement control sectors 43 and 44. Movement control sector 43, which includes rotational direction and speed information to control robot movement in a direction to the right of the current robot direction, is bounded by three movement control elements 41A, 41B and 41E, and movement control sector 44, which includes rotational direction and speed information to control robot movement in a direction to the left of the current robot direction, is bounded by three movement control elements 41A, 41C and 41D. A point along the movement control element 41A is selected to control the straight ahead movement of a robot. The speed at which the robot moves in this direction is controlled to be greater or lesser by selecting different points that fall on control element 41A which are respectively farther or nearer to a control point 42A. A point along the movement control element 41B is selected to cause a robot to turn or rotate in place to its right, with respect to its current direction, at a greater or lesser speed depending upon the distance from the control point 42A that is selected on the control element 41B. A point along the movement control element 41C is selected to cause a robot to turn or rotate in place to its left, with respect to its current direction, at a greater or lesser speed depending upon the distance from the control point 42A that is selected on the control element 41C.

With continued reference to FIG. 4, each of the movement control sectors 43 and 44 include a plurality of robot movement control soft links with each soft link being associated with a different location within each of the movement control sectors. For the purpose of this description, five such soft links are shown as 45A, 45B, 45C, 45D and 45E. Each one of the plurality of robot movement control soft links are associate with different robot movement control information stored in information store 25E of FIG. 2. The robot movement control information includes robot forward speed information and rotational direction and speed information used to control the movement of a robot. Each soft link is composed of a programmed number of pixel-coordinate groups. Each pixel coordinate represents the row and column coordinate position in the display screen. VGA displays typically employ a pixel format that includes 640 rows and 480 columns, so a pixel coordinate position can be row 30, column 50 for instance. Each pixel grouping that is included in the control overlay 40, which in this case are represented by the groupings associated with the soft links 45A-E can include the same number of pixel-coordinates or they can include a different number of coordinates. So for instance, all of the pixel groupings that fall on control element 41A, represented here by the single grouping associated with the soft link 45A, can include sixteen pixel coordinates, while the other pixel groups (41B-E) that fall on other areas of the movement control overlay can include nine pixel-coordinates. The inclusion of sixteen pixel-coordinates in the pixel groups associated with the control element 41A permits a user to more easily select a straight ahead robot movement direction than would otherwise be possible if only nine pixel-coordinates were included in these groups. Although the movement control elements 41A, 41B and 41C are illustrated to include only one soft link 45A, 45B and 45C respectively, each control element can typically include more than one such soft link.

Continuing to refer to the motion control elements 41A-C in FIG. 4, as described earlier, control element 41A is selected to move a robot in a straight ahead manner with respect to an initial robot position, control element 41B is selected to rotate a robot in place its right (or in a clockwise direction) with respect to the current direction of the robot and control element 41C is selected to rotate a robot in place to its left (or counter clockwise) with respect to the current direction of the robot. All of these directions are relative to the initial or last direction in which the robot is moving. So if a robot is initially directed to move in a straight ahead manner by selecting a position on control element 41A, and subsequently it is determined that the robot should change direction and move to the right (rotate to the right), then a position to the right of control element 41A, such as the position occupied by soft link 45D in sector 43, is selected. If the robot is to be controlled to turn to the left with respect to its current direction, either a point on control element 41C, represented by soft link 45C, or a point in a control sector 44 of the control overlay 40, represented by soft link 45E, can be selected. If the soft link 45C is selected the robot will rotate more rapidly in the counter clockwise direction as it is moving forward than if the soft link 45E is selected. As referred to above, the positions of each of the soft links 45A-E in the control overlay 40 correspond to a particular speed at which a robot is controlled to move. More specifically, a control point 42A in the control overlay can be considered the origin of the control overlay and this point represents a soft link that points to a control vector that includes information that controls a robot to not move or be at rest. Points selected that are at some distance from this origin 42A are associated with movement control information results in a robot moving at a speed that is greater than zero and rotating in the selected direction at a particular speed.

The motion control overlay 40 of FIG. 4 includes two control elements 41D and 41E that provide a visual indication of the limits of speed in a particular selected rotational direction. If a user positions their pointer device outside or beyond the boundaries of the control overlay defined by the control elements 41B, 41C, 41D and 41E, such a pointer position will not alter the current speed of a robot. In addition to the origin point 42A, control points 42B, 42C and 42D are shown as included in the control overlay 40 and each of these control points are illustrated as positioned at the terminal ends of two or three control elements 41A-E. Each of these control points 42A-E are represented as an arrow surrounded by a circle. A robot rotation control icon 46 is shown proximate to control point 42A and can be manipulated by a user to rotate the robot in a left or a right direction when it is not moving. The arrow in each of the control points 42A-E is an indicator of the direction of rotational movement of a robot.

Figure 5:
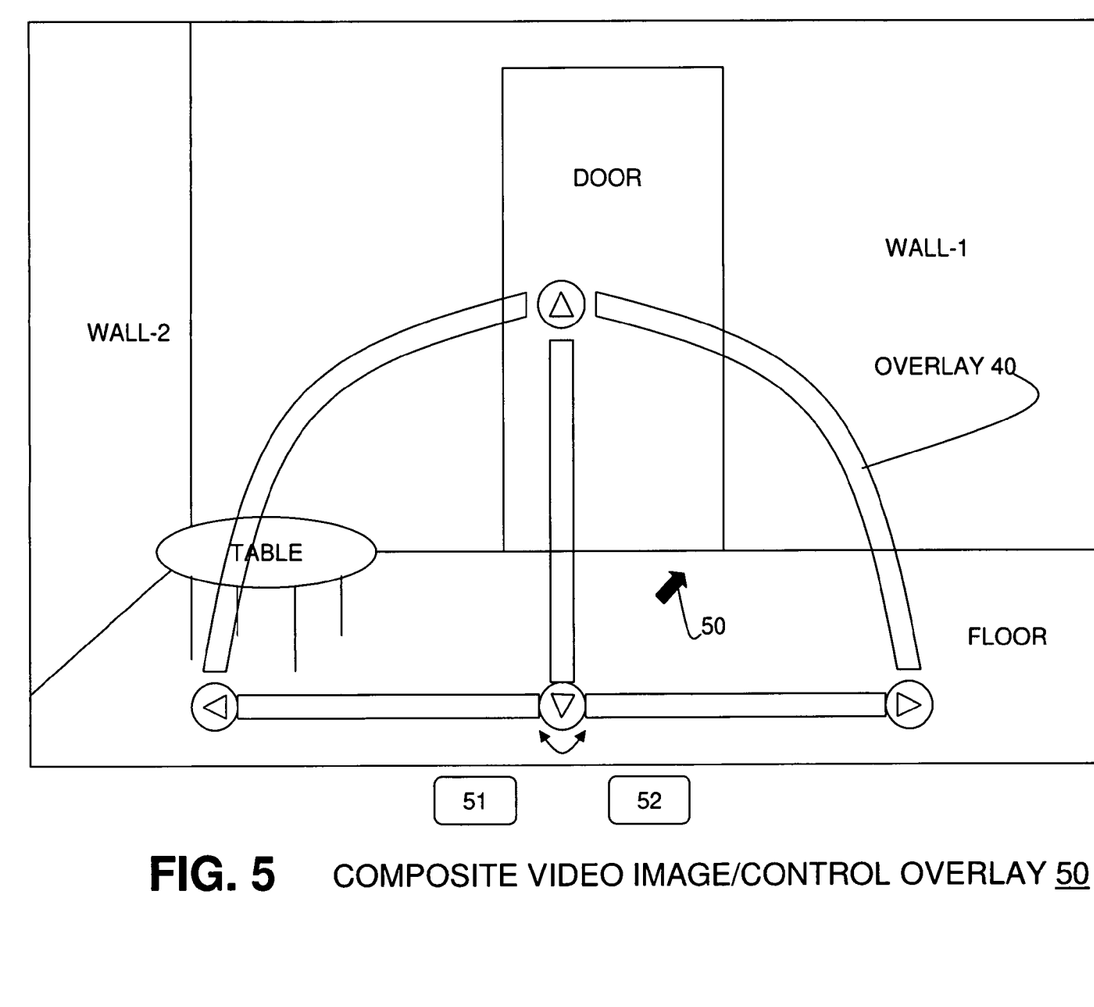
FIG. 5 is an illustration of the combined local environment representation and the direction/speed overlay.

FIG. 5 is a composite representation of the real-time video image 30 of FIG. 3 and the robot movement control overlay 40 of FIG. 4 showing the control overlay 40 in the field of the video image 30, a user controlled pointer 50 and two camera control function buttons 51 and 52. As described previously, the control overlay 40 appears in the field of the video image 30 as soon as a user moves the control pointer 50 into the field of the video image 30. By moving the control pointer 50 to a particular position within the boundaries of the control overlay 40 and selecting this position, such as the position occupied by soft link 45D in FIG. 4, a user is able to control a robot to rotate in a direction to the right of a straight ahead direction in which the robot is currently moving at the selected speed, which in the case can be approximately 0.5 feet per second. The two camera control function buttons 51 and 52 are selected to respectively turn on or to turn off the automatic camera tilt functionality.

Figure 6A:
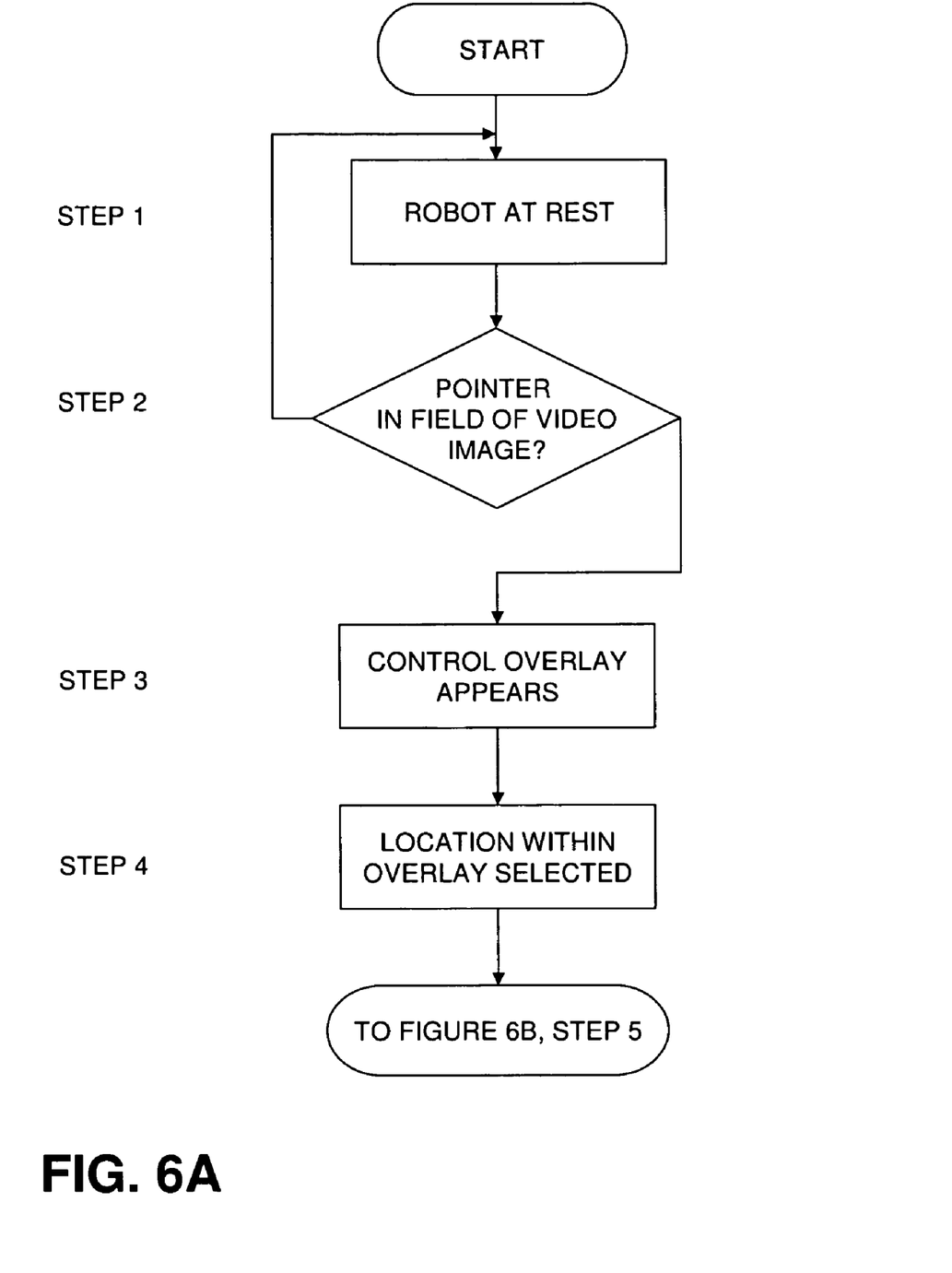
FIGS. 6A and 6B is a logical flow diagram of the process of the invention.
Figure 6B:
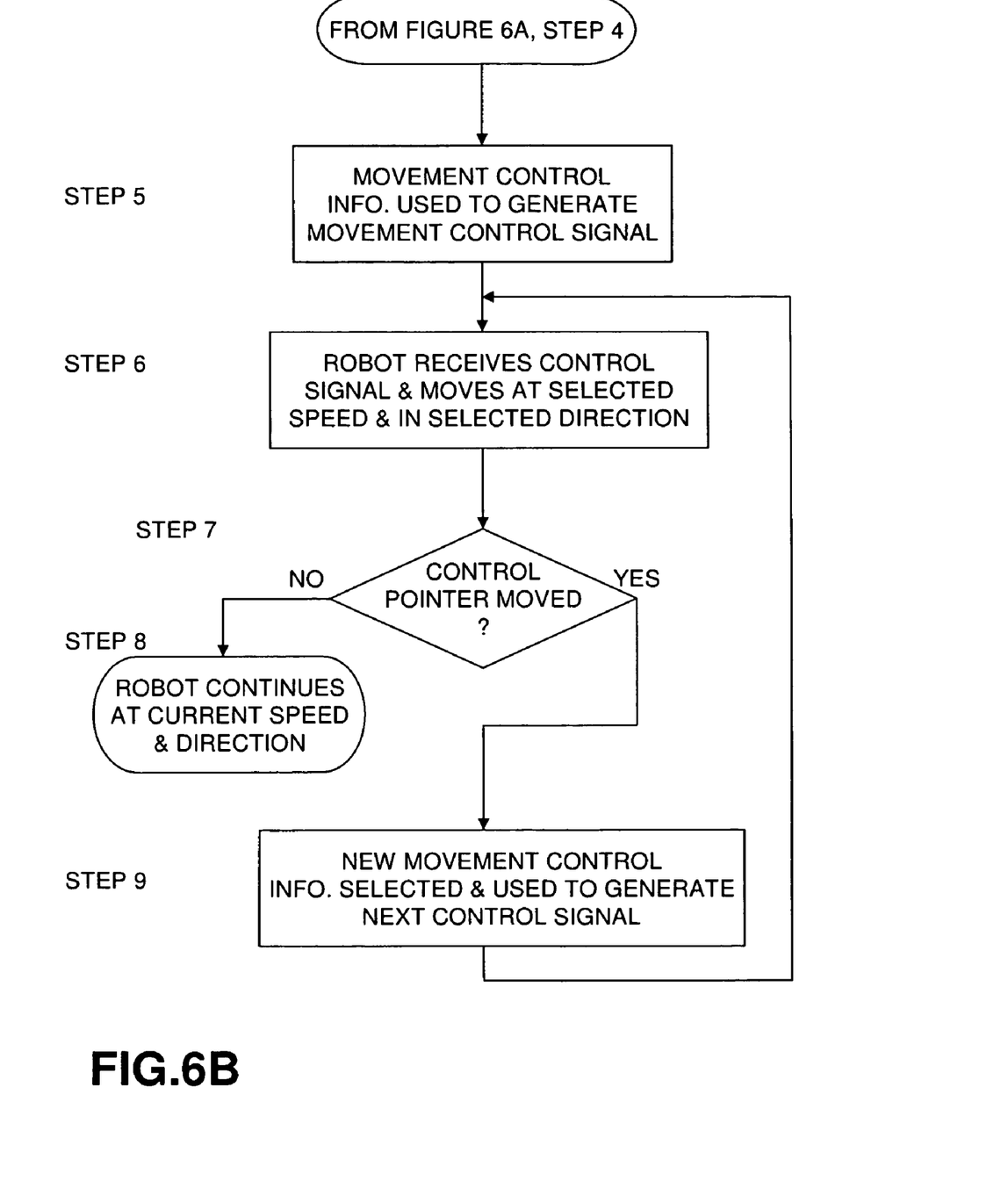

The process for using the control overlay 40 to control the movement of a robot will now be described with reference to the logical flow diagram of FIG. 6. In step 1 the robot is assumed to be at rest and the motion control overlay 40 of FIG. 4 is not visible. In step 2, if the motion control pointer is moved into the field of the real-time video image 30 of FIG. 3, then in step 3 the control overlay 40 appears in the field of the real-time video image, otherwise the process returns to step 1. In step 4, a location within the movement control overlay 40 is selected and in step 5 movement control information associated with the selected location is employed by the direction control module 25A and the speed control module 25B to generate a movement control signal which is sent to the robot drive control 35 in FIG. 2B. In step 6, the robot drive control 35 receives the movement control signal and it operates to control the robot drive mechanism to move the robot at a speed and in a direction that corresponds to the selected movement control information. If, in step 7, the movement control pointer is moved to a different location within the movement control overlay, new movement control information is sent to the direction and speed control modules 25A and 25B respectively and the process loops back to step 6. If, in step 7 the movement control pointer is not moved, then the process proceeds to step 8 and the robot continues to move at the current speed and rotational direction.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for controlling the movement of a robotic device comprising:
    capturing a real-time video image of the robotic device environment using a video capture device associated with the robotic device;
    sending the captured real-time image to a robotic control module that is remote from the robotic device, and displaying the captured real-time image within a field on a video image display device associated with the remote robotic control module;
    displaying a robotic device movement control overlay within the field of the displayed real-time video image;
    selecting a location within the movement control overlay that corresponds to a robotic device speed and direction;
    generating and sending a control message to the robotic device which is comprised of the selected speed and direction information; and
    receiving the control message at the robotic device and using the speed and direction information contained in the control message to move in the selected direction at the selected speed.

2. The method of claim 1 wherein the movement control overlay is comprised of first and second movement control sectors.

3. The method of claim 2 wherein the first movement control sector includes information used to control the robotic device to move in a direction to the right of its current direction and the second movement control sector includes information used to control the robotic device to move in a direction to the left of its current direction.

4. The method of claim 2 wherein the first movement control sector is bounded by a first and second movement control element and the second movement control sector is bounded by a first and third movement control element.

5. The method of claim 4 wherein positions along the first movement control element control the speed of the robotic device in a straight ahead direction, positions along the second movement control element control the speed of the robotic device in a direction to the right of the current direction and positions along the third movement control element control the speed of the robotic device to the left of the current direction.

6. The method of claim 2 wherein each of the first and second movement control sectors include a plurality of locations and each of the plurality of locations is associated with a single soft link.

7. The method of claim 6 wherein each one of the soft links are associated with a different set of movement control information.

8. The method of claim 7 wherein each of the sets of movement control information includes information about direction and speed.

9. The method of claim 1 wherein the real-time video image is comprised of real-time video information captured by a camera on the robotic device and sent to a robot control device.

10. An apparatus for controlling the movement of a robotic device comprising:
    a robotic device; and
    a robot control device comprising:
        a video display;
        a transceiver;
        a memory for storing robotic device movement control information and real-time video information received from the robotic device; and
        a processor that operates on the real-time video information and the movement control information to display a robotic device movement control overlay within the field of a real-time video image, responds to a control pointer command to select a location within the robotic device movement control overlay that corresponds to a speed and direction of the robotic device; generates and sends a control message to the robotic device containing the selected speed and direction information which the robotic device uses to move in the selected direction at the selected speed.

11. The apparatus of claim 10 wherein the video display included in the robot control device displays a robot movement control overlay that includes first and second movement control sectors.

12. The apparatus of claim 10 for displaying the first movement control sector which includes information used to control the robotic device to move in a direction to the right of its current direction and for displaying the second movement control sector which includes information used to control the robotic device to move in a direction to the left of its current direction.

13. The apparatus of claim 12 for displaying the first movement control element, selected positions along which first movement control element control the speed of the robotic device in a straight ahead direction, and for displaying the second movement control, selected positions along which second movement control element control the speed of the robotic device in a direction to the right of the current direction and for displaying the third movement control element, selected positions along which second movement control element control the speed of the robotic device in a direction to the left of the current direction.

14. The apparatus of claim 13 for displayed the first and second movement control sectors both of which include a plurality of locations and each of the plurality of locations is associated with a single soft link.

15. The apparatus of claim 14 for storing the soft links each of which is associated with a different movement control information set.

16. The apparatus of claim 15 for storing each of the movement control information sets which include information about the robots direction and speed.

17. The apparatus of claim 10 for displaying the first movement control sector which is bounded by a first and second movement control element and for displaying the second movement control sector which is bounded by a first and third movement control element.

* * * * *